Patented July 28, 1925.

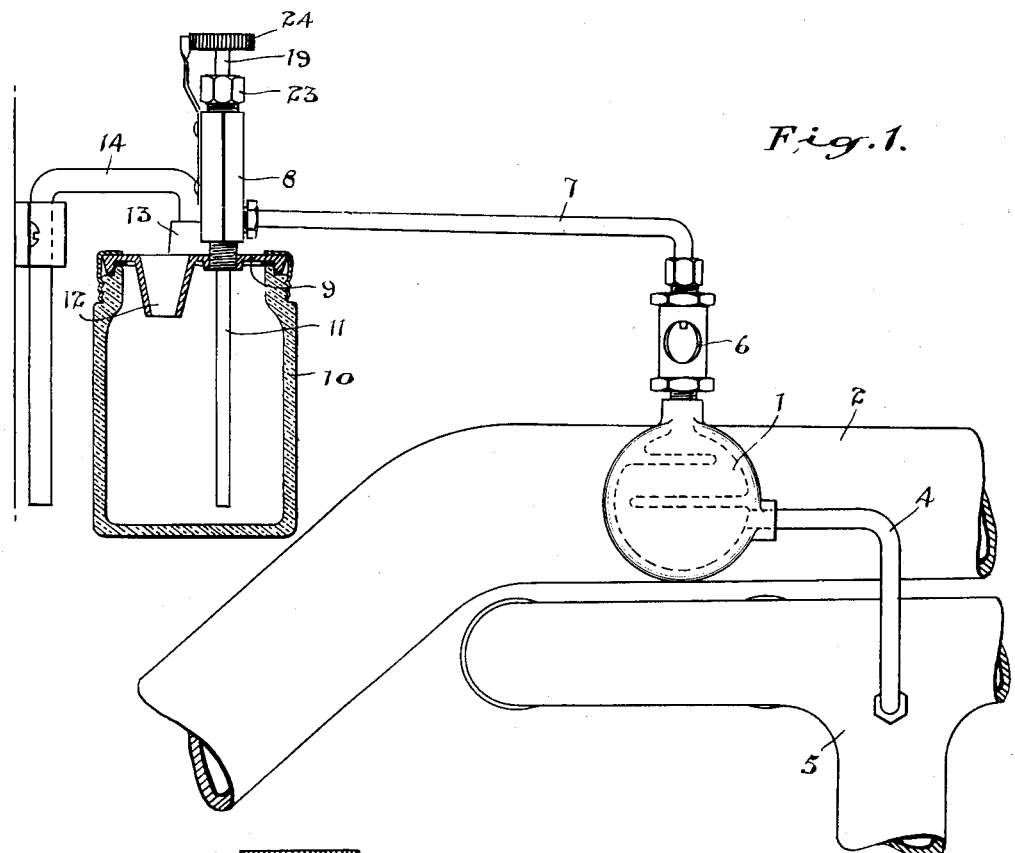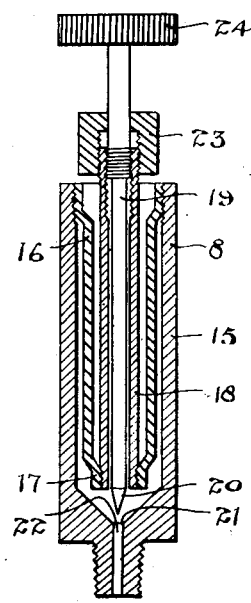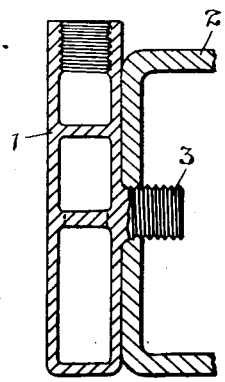

1,547,346

UNITED STATES PATENT OFFICE.

MARTIN JOSEPH QUINN, OF TORONTO, ONTARIO, CANADA.

DECARBONIZER.

Application filed December 31, 1921. Serial No. 526,368.

*To all whom it may concern:*

Be it known that I, MARTIN JOSEPH QUINN, a subject of the King of Great Britain, and resident of the city of Toronto, county of York, Province of Ontario, in the Dominion of Canada, have invented certain new and useful Improvements in Decarbonizers, described in the following specification and illustrated in the accompanying drawings, that form part of the same.

The principal objects of the invention are to improve the operating conditions of internal combustion motors, and to devise a simple, effective and positively controlled means for introducing a supply of steam to the engine without impairing the operating conditions of carburetion.

The principal feature of the invention consists in the novel construction and arrangement of parts, whereby water is fed from a supply through a closed conduit to a heated chamber wherein steam is generated and the steam is conveyed to the intake manifold of the engine to mix with the carbureted air drawn from the carbureter, and whereby the water supply is controlled by a thermostatic valve which automatically shuts off the water until the engine is warm and operates continuously to maintain a clear passage.

In the drawings, Figure 1 is an elevational part sectional diagram of my improved device.

Figure 2 is an enlarged longitudinal sectional view of the thermostatic control valve.

Figure 3 is a vertical cross section of the steam generator.

In carrying this invention into effect a steam generator 1 which is here shown in the form of a flat disc-shaped metal casing is secured to the exhaust manifold 2 of the engine and is formed of a metal which will readily conduct heat from the manifold and is provided with transverse baffles in the interior. It is preferably formed with a stud 3 projecting from one side which is threaded and screwed into a hole in the manifold.

A tube 4 leads from the perimeter of the generator 1 to the intake manifold 5, entering same above the carbureter.

A sight feed gauge 6 is connected to the perimeter of the generator 1 at the top and to this gauge is connected a tube 7 which leads to the thermostatic valve 8 mounted on the cover 9 of a water reservoir 10 which is arranged in a suitable location.

A tube 11 leads downwardly from the valve 8 to a point near the bottom of the reservoir and conducts water upwardly to the valve. The cover 9 is preferably formed with a funnel-shaped opening 12 for receiving water and admitting air.

A boss 13 is also formed on the cover in which a supporting rod 14 is secured.

The thermostatic valve forms a very important element of this invention as it is fatal to the proper operation of the engine and carbureter to allow water to get into the manifold, consequently it is necessary that the engine be run for a sufficient length of time to become thoroughly warm before the water supply is opened, to ensure such supply being properly converted into steam before it enters the manifold. This result is accomplished in a very satisfactory manner by the use of a valve in which the body is formed of a ready heat conductor and the valve or the support for same is of a material less susceptible to conduction of heat and therefore less responsive in expansion.

In the form of valve herein shown the body 15 is formed of copper, brass or other substance with a high co-efficient of expansion. Threaded within the upper end of the body 15 is a metal tube 16 of steel or other similar substance with a low co-efficient of expansion which tube is enlarged at the upper end so that its longitudinal portion is spaced from the inner wall of the valve body and its lower end 17 is reduced in diameter and threaded internally.

A central tube 18 of brass or other metal with a high co-efficient of expansion is threaded into the reduced lower end of the tube 16 and is spaced from the inner wall of said tube by reason of the reduced diameter of the lower end of the tube 16.

The upper end of the tube 18 is threaded externally and internally and within the interior threaded portion is threaded a valve stem 19 having a long needle valve 20 also formed of a material of a low expansion coefficient. This needle valve engages the seat 21 at the upper end of the passage 22 connected with the tube 11, when the metals are cold.

A packing nut 23 is threaded on the outer threaded portion of the tube 18 and the upper end of the valve stem 19 is provided with a knurled head 24 by means of which the valve may be adjusted.

When the engine is cold the valve is adjusted to close against the seat and effectually shuts off the water supply. As the engine becomes heated the expansive valve body and inner tube 18 expand and lift the valve from its seat allowing the inflow of water to the valve body. The suction of the engine creates a vacuum in the generator 1 and the connecting tubes, and water is drawn through the valve 8 to the generator passing through the gauge 6 so that the feed may be accurately regulated by the manipulation of the valve stem 19. The water dropping from the gauge 6 into the heated generator is immediately converted into steam and the steam so generated is drawn into the manifold.

There is no air mixed with the steam as the passage from the manifold to the valve 8 is a sealed passage. The suction draws the water to the generator and steam is generated at a comparatively low temperature on account of the partial vacuum existing in the generator.

A steam supply such as described creates a remarkable condition of efficiency in the engine preventing the accumulation of carbon and otherwise enhancing the operation of the engine. The automatic thermostatic valve may be regulated to suit the engine and peculiarities of change in atmospheric conditions.

The amount of water required is extremely small, consequently the valve orifice is so small that under ordinary conditions the deposits from the water would seal the opening in a very short period of operation. This difficulty is overcome by the peculiar feature of movement of the valve which responds to the continually changing temperature conditions and the continuous movement of the valve keeps the seat clear and ensures its operation.

I have described the operation of the water supply as being controlled by vacuum but if desired the cap 9 of the water container may be closed and a pressure pipe may be connected thereto from the exhaust manifold to force the water to the automatic valve.

What I claim as my invention is:—

In a decarbonizer for internal combustion engines, the combination with the intake and exhaust manifolds, a water supply, and a sealed conduit connecting said water supply with the intake manifold, of a sealed valve casing interposed in said conduit and formed of metal having a high co-efficient of expansion, a tube having a low co-efficient of expansion arranged within said valve casing and secured to the top thereof, a tube having a high co-efficient of expansion secured to the inner end of the aforesaid tube and spaced therefrom, and a valve having a low co-efficient of expansion adjustably mounted in the outer end of said inner tube and adapted to close the inlet in the base of said valve casing.

MARTIN JOSEPH QUINN.